United States Patent [19]

Taylor

[11] Patent Number: 5,256,011
[45] Date of Patent: Oct. 26, 1993

[54] MACHINE TOOL

[76] Inventor: Philip W. Taylor, 230 S. MacArthur #515, Coppell, Tex. 75019

[21] Appl. No.: 976,956

[22] Filed: Nov. 16, 1992

[51] Int. Cl.⁵ .............................. B23C 1/16; B23C 5/00
[52] U.S. Cl. .................................. 409/92; 144/144 R; 409/121; 409/124
[58] Field of Search .................. 409/92, 93, 89, 90, 409/91, 107, 108, 124, 121, 126, 79, 80, 103; 144/144 R

[56] References Cited

U.S. PATENT DOCUMENTS

| | | | |
|---|---|---|---|
| 3,697,040 | 10/1972 | Weaver | 409/129 X |
| 3,756,122 | 9/1973 | Campbell | 409/128 |
| 3,965,796 | 6/1976 | Putnam, Jr. | 409/130 |
| 4,078,474 | 3/1978 | Laskowski | 409/107 |
| 4,170,850 | 10/1979 | Horvath et al. | 51/165 R |
| 4,224,670 | 9/1980 | Yamazaki | 364/474 |
| 4,278,117 | 7/1981 | Mitchell et al. | 144/144 R |
| 4,364,695 | 12/1982 | Lenz | 409/103 |
| 4,630,215 | 12/1986 | Graham, Jr. | 364/474 |
| 4,803,633 | 2/1989 | Kishi et al. | 364/474.03 |
| 5,135,393 | 8/1992 | Eidenbenz et al. | 409/121 X |

Primary Examiner—William Briggs
Attorney, Agent, or Firm—Timmons & Kelly

[57] ABSTRACT

The cutter and the tracer of the machine tool are slaved together for movement along the three major axes, and for pivoting about two different axes. The cutter and the tracer can be pivoted together about an axis through the cutter and the axis. The cutter and the tracer can also be pivoted about a pair of parallel axes passing through the cutter and the tracer.

6 Claims, 4 Drawing Sheets

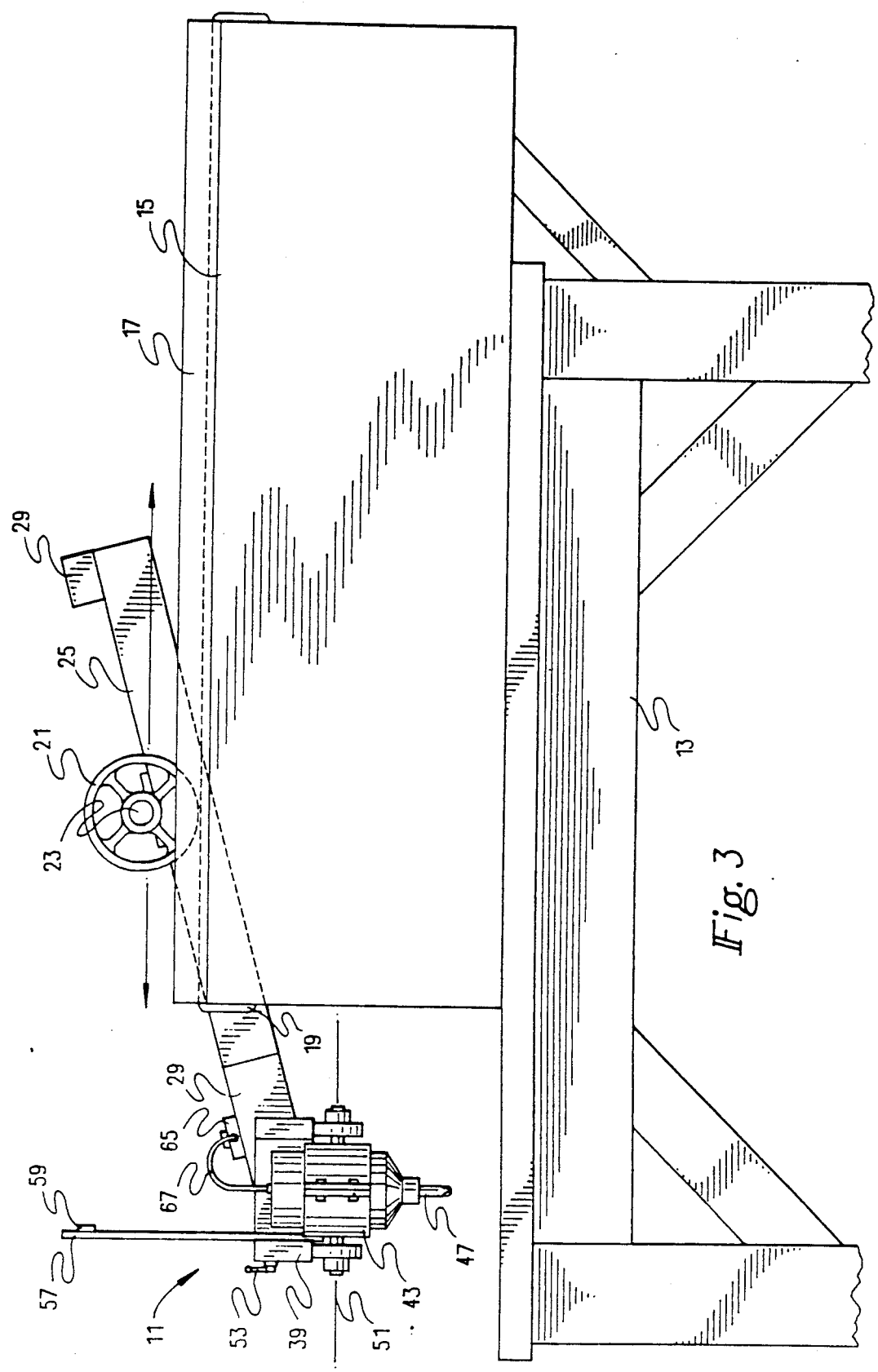

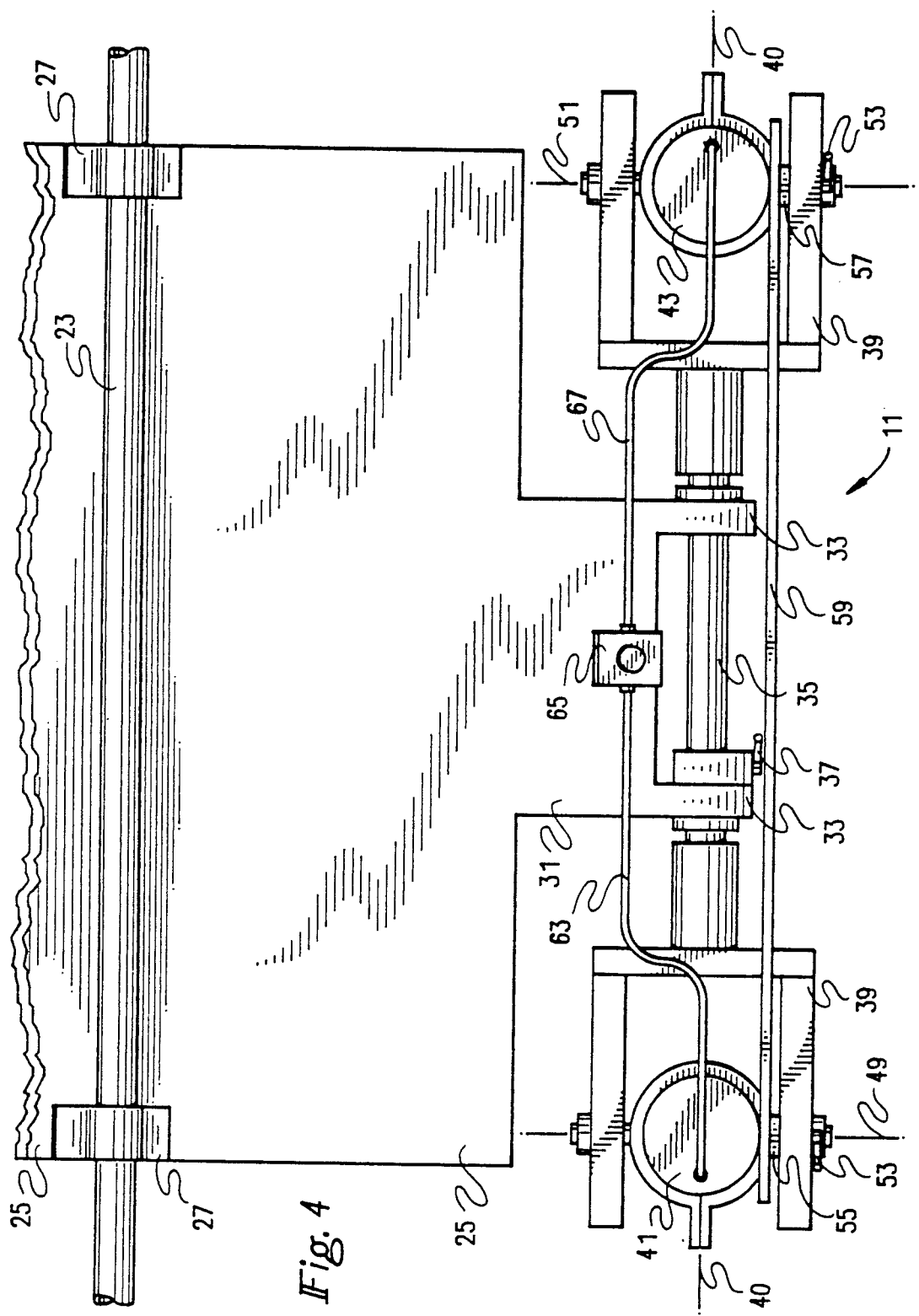

MACHINE TOOL

BACKGROUND OF THE INVENTION

1. Field of the Invention

This invention relates in general to machine tools. In particular, the invention relates to machine tools controlled by a tracer stylus assembly.

2. Description of the Prior Art

Industrial carving machines are used to reproduce objects such as wooden sculpture. A tracer on the machine is moved around on a pattern, which may be a model or an actual piece of sculpture. As the tracer is moved about, the carving machine causes a cutter to be moved about in the same manner as the tracer. As the cutter is moved, it cuts and shapes a block of raw material into a likeness of the pattern.

The disadvantage of most industrial carving machines, is that the tracer and the cutter are always vertical. Thus, the cutter can only cut the raw material from the top. The cutter cannot make undercuts, and the amount of detail is limited.

It was thus desirable to provide an industrial carving machine that would allow the tracer and the cutter to pivot together about a pair of perpendicular horizontal axes. It was also desirable to minimize the complexity of the machine to reduce costs and maintenance.

SUMMARY OF THE INVENTION

The general object of the invention is to provide an improved industrial carving machine. This objective is accomplished by a carving machine in which the tracer and the cutter can be moved along the three major axes, and can be pivoted about a horizontal axis passing through the cutter and the tracer. The tracer and the cutter can also be pivoted about a pair of parallel horizontal axes that are perpendicular to the horizontal axis passing through the tracer and the cutter. The two axes of pivot, together with movement along the three major axes, allow the tracer and the cutter to be placed in any location and any orientation within the scope of the machine.

The means for pivoting the tracer and the cutter about the two horizontal axes, includes a tracer arm extending upward from the tracer, and a cutter arm extending upward from the cutter.

The above, as well as additional objects, features, and advantages of the invention will become apparent in the following detailed description.

BRIEF DESCRIPTION OF THE DRAWINGS

FIG. 3 is a left side elevation of the tracer controlled machine of the invention.

FIG. 4 is a top plan view of a portion of the tracer controlled machine tool of the invention.

DESCRIPTION OF THE PREFERRED EMBODIMENT

Figure 1:
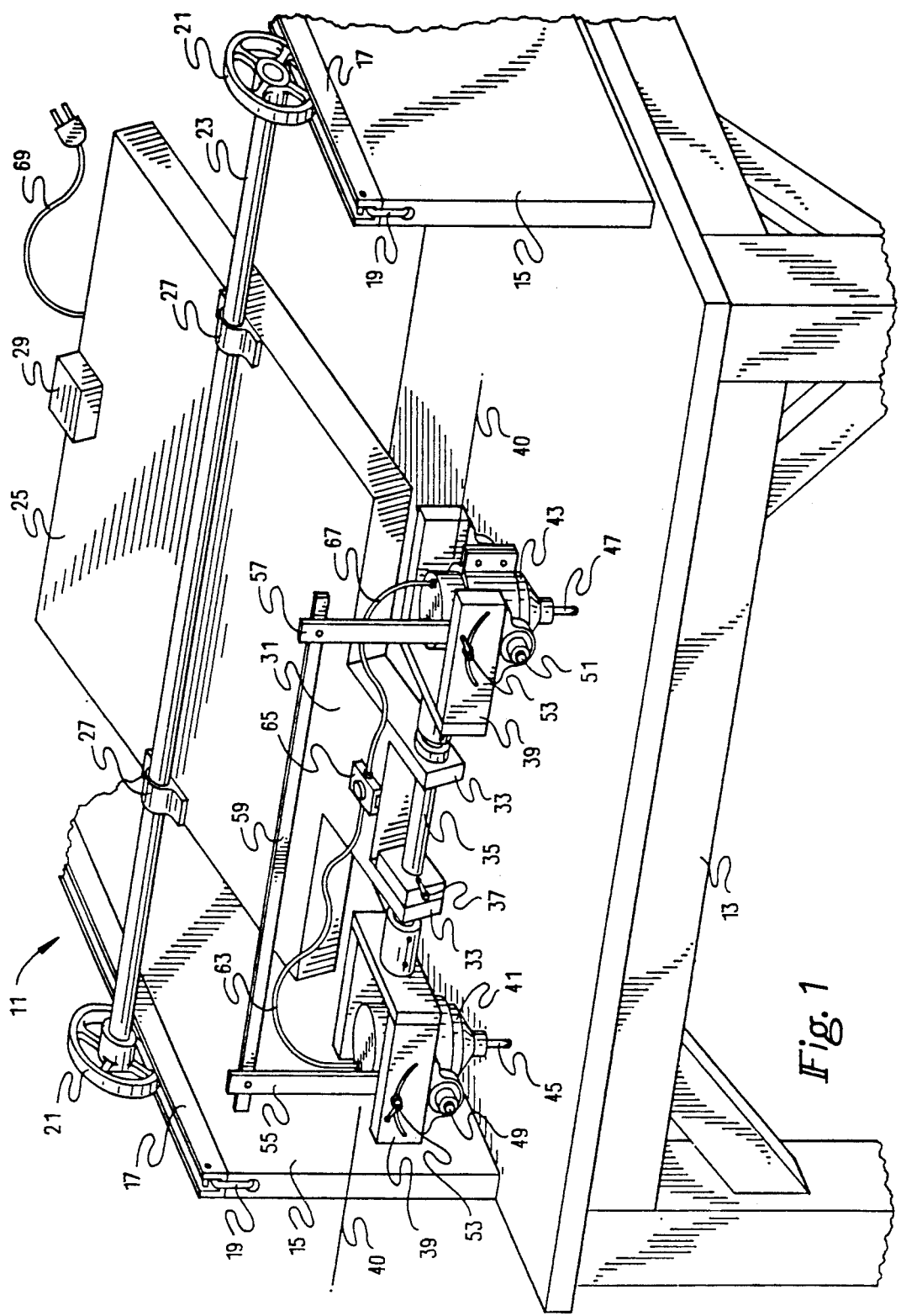
FIG. 1 is a perspective view of the tracer controlled machine of the invention.
Figure 2:
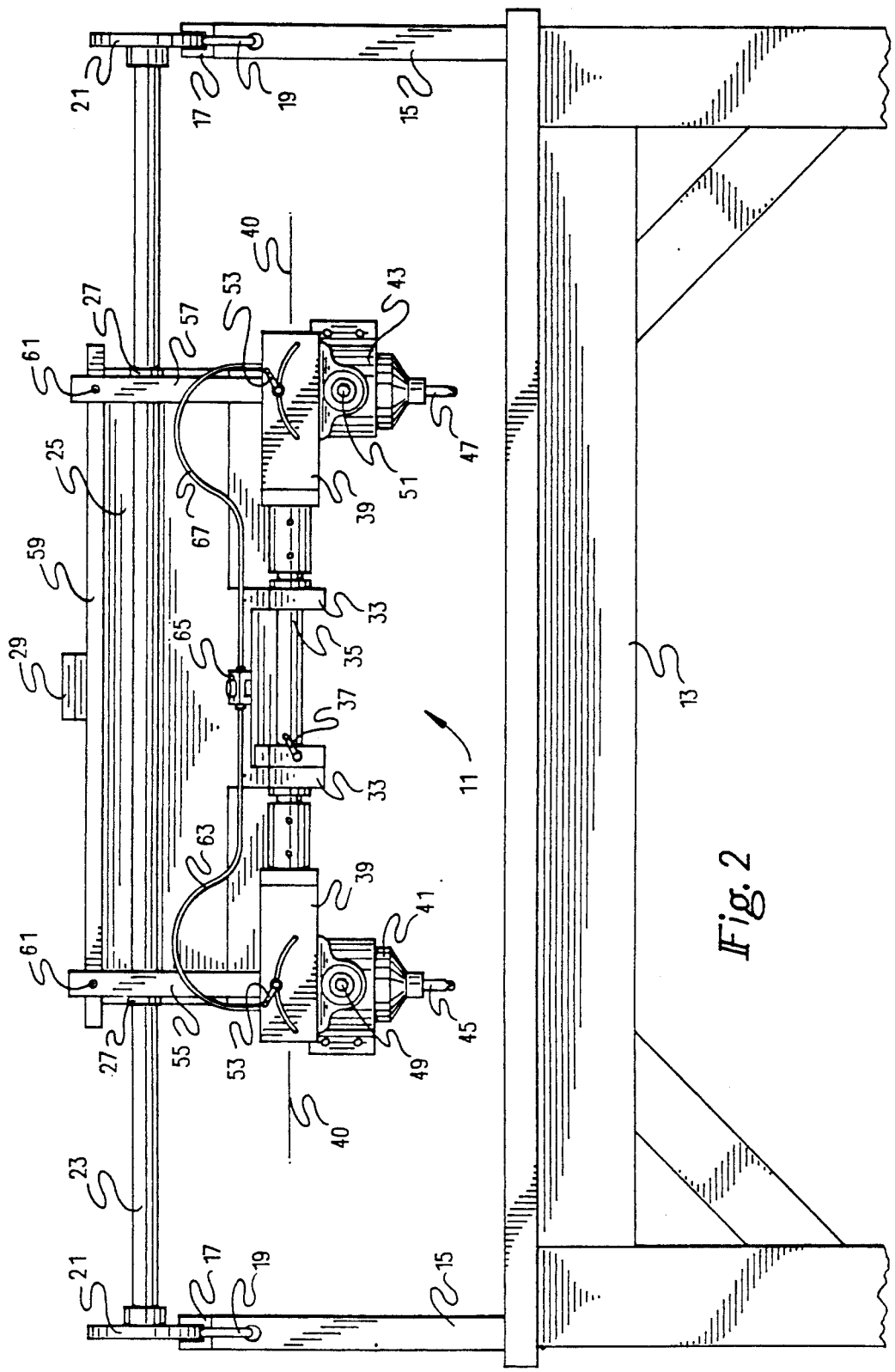
FIG. 2 is a front elevation of the tracer controlled machine of the invention.

As shown in FIGS. 1-3, the machine tool 11 of the invention is preferably mounted on a table 13. A pair of vertical supports 15 extend upward from the table 13. Each vertical support 15 runs most of the length of the table 13, and may extend backward beyond the top of the table 13, as shown in FIG. 3. A channel 17 extends along the top of each vertical support 15.

A cable 19 runs through the length of each channel 17. Each cable 19 also makes at least one loop around a pulley 21, as shown in FIG. 3. The two pulleys 21 are attached to either end of an axle 23. The cable 19 causes the pulleys 21 to travel at the same speed, so the axle 23 is always perpendicular to the channels 17.

A rectangular torsion box 25 is suspended from the axle 23 by a pair of bearings 27. The bearings 27 allow the torsion box 25 to move left and right along the length of the axle 23, and to move forward and backward with the axle 23. The torsion box 25 can also pivot about an axis through the length of the axle 23. The bearings 27 are preferably located at the edges of the torsion box 25, as seen in FIGS. 1, 2, and 4. The torsion box 25 must be rigid, so that it will not twist in response to forces applied to it.

A counterweight 29 is attached to the rear of the torsion box 25. A small, rectangular extension 31 extends forward from the front of the torsion box 25. Then, a pair of parallel arms 33 extend forward from the front of the extension 31. A horizontal support bar 35 extends through the arms 33 and can ordinarily pivot about its longitudinal axis. When desired, the horizontal support bar 35 can be locked with an angle lock 37 to prevent pivoting of the support bar 35.

A U-shaped harness 39 is attached to each end of the horizontal support bar 35. When the support bar 35 is pivoted, the two harnesses 39 also pivot together about the longitudinal axis 40 of the support bar 35.

A cutter 41 is attached to one of the harnesses 39 and a tracer 43 is attached to the other harness 39. In some cases, a cutter 41 may be attached to both harnesses. The cutter 41 is a typical cutter 41, having a cutting head 45, such as a router. The tracer 43 has a tracing head 47 for tracing the shape of a pattern, such as a model or a piece of sculpture to be replicated.

The cutter 41 and the tracer 43 can be pivoted about axes 49 and 51 that are parallel to one another. If desired, the cutter 41 and the tracer 43 can be locked with angle locks to prevent the pivoting of the cutter 41 and the tracer 43.

A cutter arm 55 extends vertically upward from the cutter 41. Likewise, a tracer arm 57 extends upward from the tracer 43. The cutter arm 55 and the tracer arm 57 are connected together with an alignment bar 59. The connections 61 between the alignment bar 59 and the cutter arm 55, and between the alignment bar 59 and the tracer arm 57, are pivot connections, to allow the alignment bar 59 to pivot relative to the cutter arm 55 and the tracer arm 57. The alignment bar 59 thus acts to cause the cutter 41 and the tracer 43 to pivot together.

Electricity is supplied to the cutter 41 through an electric cord 63, extending from a control switch 65. The control switch 65 can turn the cutter 41 on and off, and can control the speed of the cutter 41. If desired, electricity may also be supplied to the tracer 43, through an electric cord 67 extending from the control switch 65. From the control switch 65, an electric cord 69 passes through the torsion box 25 and to a plug 71 for insertion into a wall socket.

The machine tool 11 of the invention can thus be moved along three major axes. The cutter 41 and the tracer 43 can be moved forward and rearward, as the pulleys 21 roll along the channels 17. The cutter 41 and the tracer 43 can be moved left and right by moving the torsion box 25 along the length of the axle 23. The cutter 41 and the tracer 43 can be moved up and down by pivoting the torsion box 25 about the axle 23.

The cutter 41 and the tracer 43 can also be pivoted together about two different axes. The cutter 41 and the tracer 43 can be pivoted together about the horizontal axis through the horizontal support bar 35. The cutter 41 and the tracer 43 can also be pivoted about the parallel axes 49 and 51, which are perpendicular to the horizontal support bar 35.

The invention has several advantages over the prior art. These various movements of the cutter 41 and the tracer 43 allow complete coverage of a pattern, including undercuts. The cutter 41 is slaved to the tracer 43 for total and accurate duplication. Unlike prior art tracer tools, the tracer 43 is not limited to a vertical orientation.

The invention has been described in only one embodiment. It should be apparent to those skilled in the art that the invention is not so limited, but is susceptible to various changes and modifications without departing from the spirit of the invention.

I claim:

1. A machine tool, comprising:
   a cutter for cutting a work piece;
   a tracer for tracing a pattern;
   means for moving the cutter and the tracer forward and backward together;
   means for moving the cutter and the tracer left and right together;
   means for moving the cutter and the tracer up and down together;
   means for pivoting the cutter and the tracer together about a horizontal axis passing through the cutter and the tracer;
   means for pivoting the cutter and the tracer together about a pair of parallel horizontal axes.

2. A machine tool as recited in claim 1, wherein the pair of axes are perpendicular to the horizontal axis passing through the cutter and the tracer.

3. A machine tool as recited in claim 2, wherein the means for pivoting the cutter and the tracer together about a pair of parallel horizontal axes further comprises:
   a cutter arm, extending away from the cutter;
   a tracer arm, extending away from the tracer; and
   an alignment bar attached to both the cutter arm and the tracer arm for causing the cutter arm and the tracer arm to pivot together.

4. A machine tool as recited in claim 3, wherein the cutter arm extends vertically upward from the cutter.

5. A machine tool as recited in claim 3, wherein the tracer arm extends vertically upward from the tracer.

6. A machine tool as recited in claim 5, wherein the cutter arm extends vertically upward from the cutter.

* * * * *